(12) United States Patent
Peng et al.

(10) Patent No.: US 9,508,005 B2
(45) Date of Patent: Nov. 29, 2016

(54) METHOD FOR WARNING A USER ABOUT A DISTANCE BETWEEN USER'S EYES AND A SCREEN

(71) Applicant: Tianma Micro-Electornics Co., Ltd., Shenzhen (CN)

(72) Inventors: Jinxing Peng, Shenzhen (CN); Jia Xie, Shenzhen (CN)

(73) Assignee: TIANMA MICRO-ELECTRONICS CO., LTD., Shenzhen (CN)

( * ) Notice: Subject to any disclaimer, the term of this patent is extended or adjusted under 35 U.S.C. 154(b) by 65 days.

(21) Appl. No.: 14/591,918

(22) Filed: Jan. 7, 2015

(65) Prior Publication Data
US 2015/0379716 A1 Dec. 31, 2015

(30) Foreign Application Priority Data
Jun. 30, 2014 (CN) .......................... 2014 1 0309470

(51) Int. Cl.
*G06K 9/00* (2006.01)
*G08B 21/02* (2006.01)
*G06T 7/00* (2006.01)
*G03B 13/00* (2006.01)

(52) U.S. Cl.
CPC ....... *G06K 9/00617* (2013.01); *G06K 9/00604* (2013.01); *G06T 7/0042* (2013.01); *G08B 21/02* (2013.01); *G06T 2207/20144* (2013.01); *G06T 2207/30201* (2013.01)

(58) Field of Classification Search
USPC ........ 382/100, 103, 106–107, 117–118, 162, 382/168, 173, 181, 191–195, 199, 209, 219, 382/232, 254, 274, 276, 287–291, 305, 382/312; 600/111; 348/345, 8, 419
See application file for complete search history.

(56) References Cited

U.S. PATENT DOCUMENTS

| | | | |
|---|---|---|---|
| 7,450,171 B2 * | 11/2008 | Ide .......................... | G02B 7/28 348/345 |
| 2010/0073349 A1 | 3/2010 | Ishii et al. | |
| 2010/0149073 A1* | 6/2010 | Chaum .............. | G02B 27/0093 345/8 |
| 2012/0105430 A1* | 5/2012 | Waschbuesch ....... | G06T 7/0016 345/419 |
| 2013/0237759 A1* | 9/2013 | Berglund ............... | A61B 1/227 600/111 |
| 2014/0169642 A1* | 6/2014 | Law ................... | G06K 9/00597 382/117 |
| 2014/0355830 A1* | 12/2014 | Park ................... | G06K 9/00228 382/103 |

FOREIGN PATENT DOCUMENTS

| | | |
|---|---|---|
| CN | 101192270 A | 6/2008 |
| CN | 101893858 A | 11/2010 |
| CN | 102841354 A | 12/2012 |
| CN | 103019917 A | 4/2013 |
| CN | 103607622 A | 2/2014 |

* cited by examiner

*Primary Examiner* — Seyed Azarian
(74) *Attorney, Agent, or Firm* — Anova Law Group, PLLC

(57) ABSTRACT

Embodiments of the present disclosure provide a method for warning a user about a distance between the user's eyes and a screen. The method includes: acquiring an image containing the user's eyes; obtaining the number of pixels between the user's eyes from the image; comparing the number of the pixels between the user's eyes with a preset value; and warning the user if the number of the pixels between the user's eyes is larger than the preset value.

27 Claims, 17 Drawing Sheets

METHOD FOR WARNING A USER ABOUT A DISTANCE BETWEEN USER'S EYES AND A SCREEN

CROSS-REFERENCES TO RELATED APPLICATIONS

This application claims the benefit of priority to Chinese Patent Application No. 201410309470.6, filed with the Chinese Patent Office on Jun. 30, 2014 and entitled "METHOD FOR WARNING A USER ABOUT A DISTANCE BETWEEN USER'S EYES AND A SCREEN", the content of which is incorporated herein by reference in its entirety.

FIELD OF THE INVENTION

The present invention relates to a viewing distance for a display device, and more particularly to devices and methods for warning a viewer to maintain a healthy watching distance from a display screen.

BACKGROUND OF THE INVENTION

With the popularity of electronic devices, such as smart phones and tablet computers, various electronic games and websites keep coming up with new products, thus making people increasingly dependent on electronic devices. Usage of smart phones, panel computers, and the like can be found in activities, such as walking, eating, drinking, being in a car, or even resting in bed.

It is harmful to the eyes and bad for eyesight due to prolonged watching of an electronic display and an improper short distance between the eyes and the display screen of the electronic device. For example, myopia and other eye diseases have been commonly found in primary and middle school students. Nowadays, known eye protecting solutions require additional special apparatuses, such as commonly used infrared sensors, ultrasonic sensors, or directly used distance sensors, to acquire data related to eyes. However, these technologies will increase hardware costs and cannot solve the problem of inaccurate measurements. For example, for the distance sensor, if a user's hand is placed above the sensor during operation, the distance that the sensor detects is the distance between the user's hand and the display screen rather than the distance between the user's face and the display screen, thereby causing an incorrect measurement. The present disclosure provides a method that uses a front camera of the electronic device to capture images and processes the captured images to obtain the number of pixels between the user's eyes and a screen or the distance between the user's eyes and a screen of the electronic devices to warn the user of a too close (improper) viewing distance. The method according to the present invention does not require to equip the electronic device with a distance sensor or the like, thereby avoiding incorrect measurements, saving costs, and simplifying the manufacture process of the electronic device.

BRIEF SUMMARY OF THE INVENTION

In view of this, embodiments of the present disclosure provide a method for warning a user (viewer) about an improper distance between user's eyes and a screen. The method includes:

acquiring an image containing the user's eyes;

obtaining a number of pixels between the user's eyes from the image;

comparing the number of pixels between the user's eyes with a preset (predetermined) value;

warning (alerting) the user if the number of pixels between the user's eyes is larger than the preset (predetermined) value.

Embodiments of the present disclosure further provide an electronic device for warning a user about an improper distance between user's eyes and a screen. The electronic device includes:

an image acquiring unit configured to acquire an image containing the user's eyes;

an information obtaining unit configured to obtain a number of pixels between the user's eyes from the image;

a comparing and determining unit configured to compare the number of pixels between the user's eyes with a preset (predetermined) value;

a signal transmitting unit configured to send (transmit) a warning signal to the user if the number of pixels between the user's eyes is larger than the preset (predetermined) value.

BRIEF DESCRIPTION OF THE DRAWINGS

In order to more clearly illustrate the technical solutions of the embodiments of the disclosure, the drawings used for the description of the embodiments will be briefly introduced below. However, the drawings used for the description below illustrate only some embodiments of the disclosure, because modifications and substitutions may be further made on these drawings by those skilled in the art without creative work.

DETAILED DESCRIPTION OF THE INVENTION

Technical solutions of the disclosure will be described below in conjunction with accompanying drawings. It can be understood that embodiments described herein are only some but not all embodiments of the disclosure herein. All other embodiments obtained by those with ordinary skill in the art without creative work are within protecting scope of the disclosure.

First Embodiment

As described in the technical background, conventional eye protecting solutions for measuring a distance between a user and a display device dependent on external special apparatuses, such as a distance sensor and an infrared sensor, thus increasing the device cost. Furthermore, an error in measurement is easily resulted when there are other objects between the user and the screen, since the distance detected by the infrared sensor is the distance between the objects and the screen rather than the distance between the eyes and the screen.

In view of this, the first embodiment of the present disclosure provides a method for warning a user about a distance between user's eyes and a screen of an electronic device. The method includes: acquiring an image containing the user's eyes; obtaining a number of pixels between the user's eyes from the image, comparing the number of pixels between the user's eyes with a preset (predetermined) value; and warning (alerting) the user (or sending a warning signal to the user) if the number of pixels between the user's eyes is larger than the preset (predetermined) value. In the first embodiment, the preset value is a preset number of pixels and the method further comprises: comparing a number of pixels between the user's eyes with the preset number of pixels; and sending a warning signal to the user if the number of pixels between the user's eyes is larger than the preset number of pixels.

Figure 1:
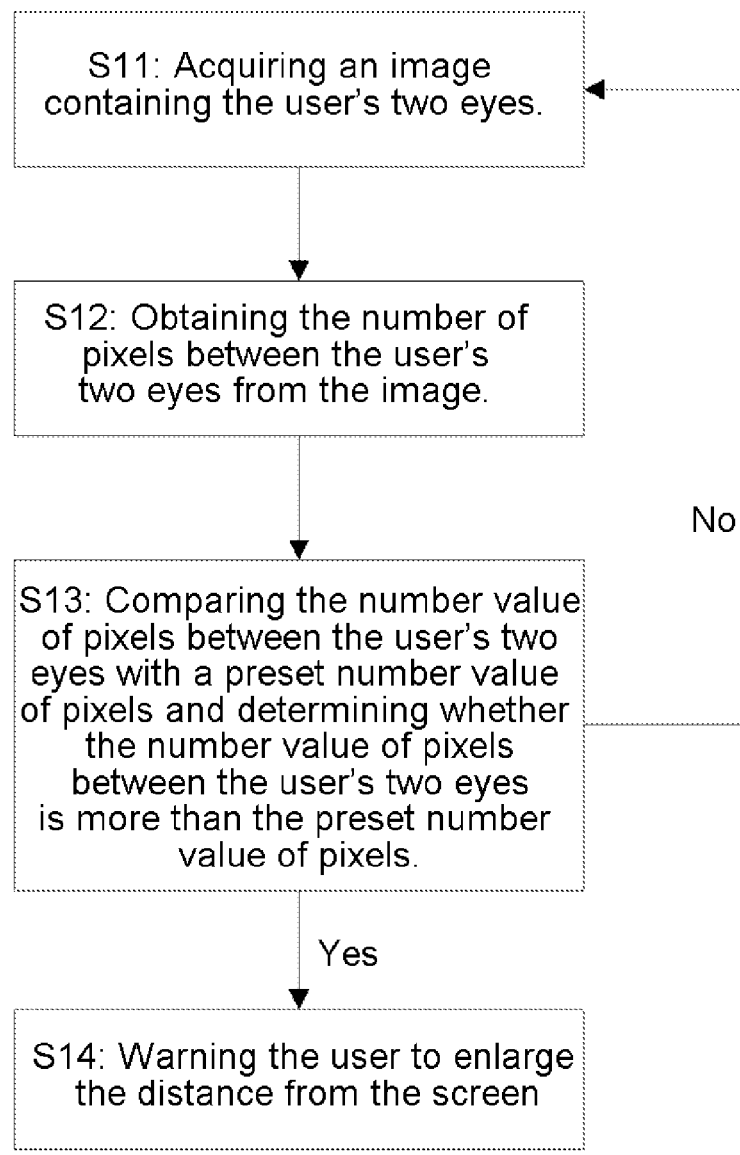
FIG. 1 is a flow chart of a method for warning a user about a distance between user's eyes and a screen according to a first embodiment of the disclosure.

FIG. 1 is a flowchart of a method for warning (alerting) a user about a distance between user's eyes and a screen of an electronic device according to a first embodiment of the disclosure. As shown in FIG. 1, the method includes steps S11-S14 as below.

First, step S11 is performed to acquire (capture) an image containing the user's eyes. Specifically, the image can be captured by a camera of the electronic device. The captured image can be pre-processed such as gray scaled and illumination compensated, to improve the quality of the captured image and obtain a gray scale image. The presence of a human face can be detected from the gray scale image by a frame difference approach and a Gaussian Mixture background modeling approach, and the position of the human face in the gray scale image can be further determined.

Next, step S12 is performed to obtain a number of pixels between the user's eyes from the gray scale image. After determining the position of the human face in the image, potential false organs can be filtered out according to features of five sense organs of the human face. The position of the human face in the image can be located to determine positions of the user's eyes and further to determine the number of pixels between the user's eyes.

Next, step S13 is performed to compare the number of pixels between the user's eyes with a preset (predetermined) value to determine whether the number of pixels between the user's eyes is larger than the preset value. The electronic device stores the preset value and compares the obtained number of pixels between the user's eyes with the preset value. The preset value is the number of pixels between the user's eyes computed from the distance between the user's eyes in the gray scale image when the distance between the user's eyes and the screen is within a safe distance. The number of pixels between the user's eyes may also be the number of pixels between the user's pupils so as to monitor the distance between the user's eyes and the screen more precisely.

It is to be understood that, the more the user's eyes close to the screen, the larger the number of the pixels between the user's eyes in the gray scale image.

If the number of pixels between the user's eyes is larger than or equal to the preset value, which indicates that the distance between the user's eyes and the screen is relatively close, step S14 is performed (carried out) to warn (alert) the user to move farther away (increase the distance) from the screen, so as to prevent eyestrain resulted from a too close viewing distance. The user can be warned by means of displaying an eye protecting image, instantly blanking the screen, popping-up a visual warning signal or message, or playing (generating) an acoustic warning signal or a voice warning message.

Optionally, the preset (predetermined) value may be manually set by the user. In a specific embodiment, the method requires the user to manually enter the preset value for warning the user about the distance between the user's eyes and a screen. The electronic device is placed at a position where it is comfortable for the eyes to watch and is controlled to capture an image containing the user's eyes. A pre-stored software application (program instructions or codes executable by a processor in the electronic device, collectively referred to as software) in the electronic device is executed to obtain the number of pixels between the user's eyes in the image and the number of pixels between the user's eyes in the image is used as the preset number of pixels. The preset number of pixels manually set by the user is more suitable for the user's personal habits and more humanized.

If the number of pixels between the user's eyes is smaller than the preset value, which indicates that the distance between the user's eyes and the screen is within the safe distance, then the process returns to step S11 to perform the next loop after a predetermined time.

Preferably, the time interval between the implementation of every two steps s11 for acquiring the image containing the user's eyes is equal (uniformly spaced), so as to guarantee eye-protection of the user, thereby preventing eyestrain caused by the too close (improper) distance between the eyes and the screen.

In the above described embodiment, the image containing the user's eyes is preferably captured by a front camera of the electric device, which can capture the image containing the human face more efficiently.

The method for warning a user about a distance between the user's eyes and the screen provided by the first embodiment of the present disclosure will automatically warn the user that the user's eyes are too close to the screen and should be moved away from the screen when the eyes of the user are too close to the screen, thereby preventing dry eyes and harm to the eyes resulted by watching the screen in a too short distance and for a long time, so as to protect the eyesight of the user.

Figure 2:
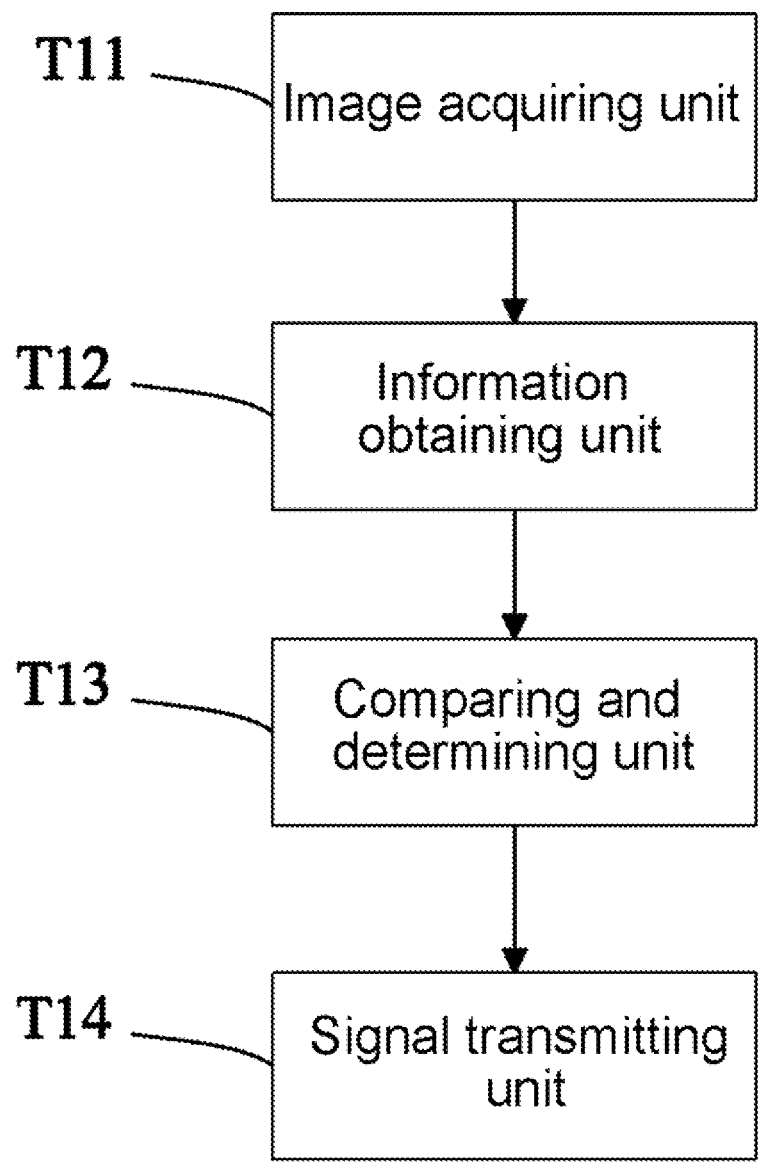
FIG. 2 is a block diagram of an electronic device according to the first embodiment of the disclosure.

The embodiment also provides an electronic device. FIG. 2 is a block diagram of an electronic device provided by the first embodiment of the disclosure. The electronic device includes an image acquiring unit T11, an information obtaining unit T12, a comparing and determining unit T13 and a signal transmitting unit T14. Functions of each unit will be described below.

The image acquiring unit T11 is configured to acquire an image containing the user's eyes. The image acquiring unit operates the same or similar way as the above-described step S11 in the first embodiment.

The information obtaining unit T12 is configured to obtain the number of pixels between the user's eyes from the image. The information obtaining unit operates the same or similar way as the step S13 in the first embodiment.

The comparing and determining unit T13 is configured to compare the number of pixels between the user's eyes with the preset number of pixels, and to determine whether the number of pixels between the user's eyes is larger than the preset number of pixels. The comparing and determining unit operates the same or similar way as the above-described step S13 in the first embodiment.

The signal transmitting unit T14 is configured to enable the electronic device to warn the user if the number of the pixels between the user's eyes is larger than or equal to the preset number of pixels, which indicates that the distance between the user's eyes and the screen is relatively close. The warning can be generating the same or similar way as the above-described step S14 in the first embodiment.

Optionally, the electronic device may be a cell phone, a tablet computer, a notebook computer, a desktop computer, or other electronic devices that can be used by the user for a prolonged time period. All those electronic devices can be configured to warn the user to increase the distance from the electronic device when the user's face is too close to the electronic device, so as to protect the eyesight of the user.

Optionally, when an approach for comparing the distance between the user's eyes and the screen with the safe distance is used to warn the user, the safe distance may be different for different electronic devices. The screen size and watching distance are different for the cell phone, the tablet computer, the notebook computer, and a desktop computer, therefore, the preset distance between the user's eyes and the screen is also different. The method can be used in a variety of different electronic devices by setting different preset distances between the eyes and the screen of the electronic devices, thus to broaden the scope of applications of the method.

Preferably, a front camera of the electronic device is used to capture the image and transmit the image data to backstage software to process. The image acquiring unit is the front camera, which may be a wide-angle camera. The wide angle camera has a relative wide viewing angle and can capture the image of the user's eyes more correctly so as to reduce the dead viewing angle.

When the distance between the user's eyes and the screen of the electronic device is relatively close, the electronic device provided by the first embodiment of the present disclosure will automatically warn the user that the user is too close to the screen and should increase the distance from the screen when the eyes of the user is too close to the screen, thereby preventing dry eyes and damage to the eyes resulted by watching the screen in a short distance and for a prolonged period of time, so as to protect the eyesight of the user.

Second Embodiment

The second embodiment of the present disclosure provides a second method for warning a user to keep a proper distance between the user's eyes and a screen. The method includes: acquiring an image containing the user's eyes; obtaining a number of pixels between the user's eyes from the image; converting the number of pixels between the user's eyes into a distance between the user's eyes; and comparing the distance between the user's eyes with a preset (predetermined) value; and warning the user if the distance of the pixels between the user's eyes is larger than the preset (predetermined) value. In the second embodiment, the preset value is a preset distance between the eyes of the user.

Figure 3:
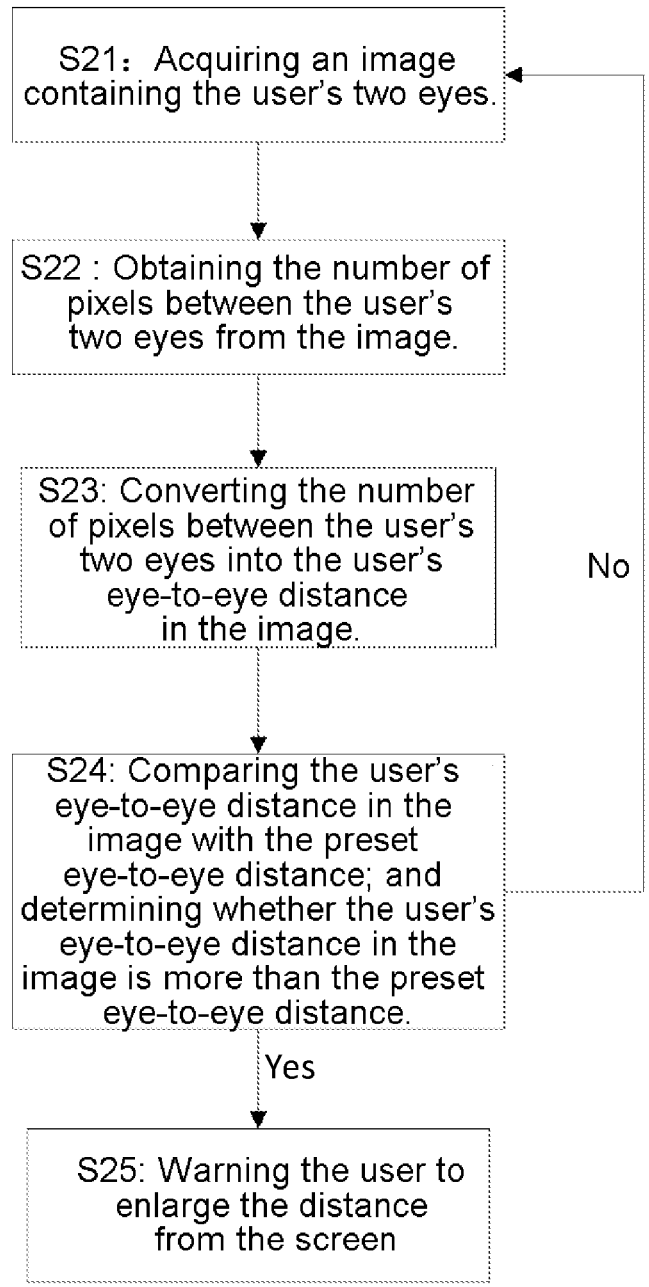
FIG. 3 is a flowchart of a method for warning a user about a distance between user's eyes and a screen according to a second embodiment of the disclosure.

FIG. 3 is a schematic view of a third method for warning a user about a distance between the user's eyes and a screen according to a third embodiment of the disclosure. As shown in FIG. 3, the third method includes steps S21-S25 as below.

First, step S21 is performed to acquire an image containing the user's eyes. Specifically, the image can be captured by a camera. The acquired image can be pre-processed, such as gray scaled and/or illumination compensated, to improve the quality of the captured (acquired) image and obtain a gray scale image. The presence of a human face can be detected from the gray scale image by a frame difference approach and a Gaussian Mixture background modeling approach and the position of the human face in the gray scale image can be further determined.

Next, step S22 is performed to obtain a number of pixels between the user's eyes from the gray scale image. After determining the position of the human face in the image, potential false organs can be filtered out according to features of five sense organs of the human face. The position of the human face in the image can be located to determine positions of the user's eyes and further to determine the number of pixels between the user's eyes through analyzing the image by a software program in the electronic device. Herein the number of pixels between the user's eyes may be the number of pixels between the user's two pupils.

Next, step S23 is performed to translate the number of pixels between the user's eyes into a distance between the user's eyes in the image. In a first direction of this image, the relation between the distance between the user's eyes "d" and the number of pixels between the user's eyes "n" is:

$$d = n \times L \qquad \text{Equation (1)}$$

wherein, n is the number of pixels between the user's eyes in the first direction of this image; and L is the size of each pixel in the first direction.

In a general case, the pixel is rectangular shaped and includes a length direction and a width direction. The first direction may be the length direction of the pixel or the width direction of the pixel. The first direction acting as the pixel length direction is taken as an example to describe Equation (1) in detail. There are a plurality of pixels between the user's eyes in the image. The number of the pixels between the user's eyes is "n" along the length direction, therefore, the distance "d" is the total length of n pixels. That is, the distance between the user's eyes along the length direction is obtained by multiplying the number of pixels n with the length of each pixel.

Similarly, the first direction may be the width direction of the pixel and L may be the width of the pixel. There are a plurality of pixels between the user's eyes in the image. The number of pixels between the user's eyes is n along the width direction, therefore, d is the total length of n pixels. That is, the distance between the user's eyes along the width direction is obtained by multiplying the number of the pixels n with the width of each pixel.

The size L of the pixel along the first direction may be pre-stored in the electronic device applying this method. When the number n of the pixels between the user's eyes in the first direction is obtained, a system of the electronic device may perform the operation of multiplying the number n of the pixels with the size L of the pixel along the first direction.

It is to be understood that, the closer the user's eyes is to the screen, the larger is the number of pixels between the user's eyes in the captured (acquired) image, namely, the larger the converted distance d between the user's eyes in the image becomes. On the contrary, the farther away the user's eyes are from the screen, the smaller is the number of pixels between the user's eyes in the captured (acquired) image, namely, the smaller the converted distance d between the user's eyes in the image becomes.

It should be noticed that d is a distance between the user's eyes along the first direction, therefore, when a direction of a connection line between the user's eyes is different from the first direction, that is, the direction of the connection line is different from either the length direction or the width direction of the pixel, the distance d is not the actual distance between the user's eyes but only the distance between the user's eyes along the first direction. However, the distance between the user's eyes along the first direction may be used to replace the actual distance between the user's eyes.

Next, step S24 is performed to compare the distance between the user's eyes in the image with the preset distance between the user's eyes; and to determine whether the distance between the user's eyes in the image is larger than the preset distance between the user's eyes. The preset distance between the user's eyes is pre-stored in the electronic device. The distance between the user's eyes obtained in step S23 is compared with the preset distance between the user's eyes.

As discussed above, the closer the user's eyes are to the screen, the larger is the distance between the user's eyes in the image. Whether the distance between the user's eyes in the image is larger than the preset distance between the user's eyes can be determined by comparing the preset distance between the user's eyes with the distance between the user's eyes in the image.

The preset distance between the user's eyes can be obtained through approaches described below. Suppose that there is a user whose eyes spacing distance is an average eyes spacing distance of human. When this user uses the electronic device within the safe distance, distance between the user's eyes in the captured image is taken as the preset distance between the user's eyes. Preferably, a plurality of preset distances between the user's eyes may be pre-stored in the electronic device. For example, a plurality of preset distance values between eyes for different genders and ages of people may be pre-stored. In the step S24, the plurality of preset distances between the user's eyes are compared with the distance between the user's eyes in turn to determine whether the distance between the user's eyes is larger than one of the plurality of preset distances between the user's eyes. Using the plurality of preset distance values between the user's eyes to compare enables the method to be more suitable for the user.

Optionally, the preset distance between the user's eyes can be manually set by the user. Specifically, the method requires the user to manually set the preset distance between the user's eyes in advance. The electronic device is placed at a position where it is comfortable for the eyes to watch, and then the electronic device is controlled to capture the image containing the user's eyes. Then, a pre-stored software program in the electronic device can be executed to obtain the number of pixels between the user's eyes in the image. The number of pixels is converted into the distance between the user's eyes in the image, and the distance between the user's eyes in the image is taken as the preset distance between the user's eyes. The approach for converting the number of pixels into the distance between the user's eyes is the same as that of the step S23. The approach for manually setting the preset distance between the user's eyes is more suitable for the user's personal habits, this makes the method be more humanized.

If the distance between the user's eyes in the image is larger than or equal to the preset distance between the user's eyes, step S25 is performed. When the distance between the user's eyes in the image is larger than or equal to the preset distance between the user's eyes, which indicates that the distance between the user's eyes and the screen is too close, the user is warned to move further from the screen to prevent eyestrain caused by a too close distance. The user can be warned by means of displaying eye protecting images, blanking the screen, popping-up a visual warning signal or message, or playing (sending) an acoustic warning signal or a voice warning message. After warning the user, the process returned to step S21 to perform the next loop after a predetermined time.

If the distance between the user's eyes in the image is smaller than the preset distance between the user's eyes, which indicates that the distance between the user's eyes and the screen is within the safe distance, then the method returns to step S21 to perform the next loop after a predetermined time.

Preferably, the time interval between the implementation of every two steps S21 is equal (uniformly spaced), so as to guarantee the eye-protection effect of the user, thereby preventing eyestrain caused by the too close distance between the eyes and the screen.

The second embodiment of the disclosure provides another example which is different from the first example. The difference between them is that when the direction of the connection line between the eyes of the user is different with either the length direction or the width direction, the step 23 for converting the number of the pixels between the user's eyes into the distance between the user's eyes in the image is performed as below.

Figure 4:
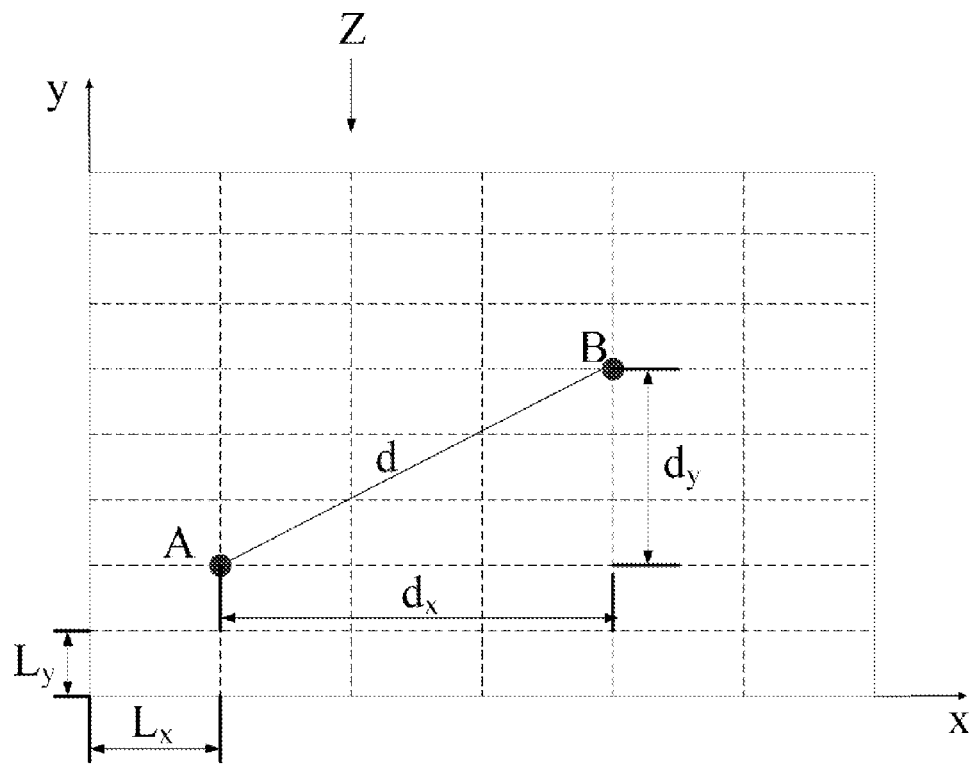
FIG. 4 is a mathematical diagram for computing the distance between the user's eyes according to another example of the second embodiment of the disclosure.

In a general case, the pixel is rectangular shaped and includes two directions, namely the length direction and the width direction. For each electronic device, the size of the pixel in the length direction and the size of the pixel in the width direction are known. Now the length direction of the pixel is along the x direction and the width direction of the pixel is as along the y direction. FIG. 4 is a graph diagram for computing the distance between the user's eyes according to another example of the second embodiment of the disclosure. In an image Z, since the connection line between the users' two eyes A and B is not parallel with either the x direction or the y direction, the distance d between the users' two eyes A and B in the image can be decomposed into a length $d_x$ along the x direction and a length $d_y$ along the y direction. The length $d_x$ along the x direction totally includes $n_x$ pixels in the x direction, while the length $d_y$ along the y direction totally includes $n_y$ pixels in the y direction. That is, for the distance d between the users' two eyes A and B in the image D, the length $d_x$ along the x direction of the pixel meets the following equation (2) and the length $d_y$ along the y direction of the pixel meets the following equation (3):

$$d_x = n_x \times L_x \qquad \text{Equation (2)}$$

$$d_y = n_y \times L_y \qquad \text{Equation (3)}$$

wherein $L_x$ is the size of the pixel in the length direction and $L_y$ is the size of the pixel in the width direction.

The size $L_x$ of the pixel in the length direction and size $L_y$ of the pixel in the width direction can be pre-stored in the electronic device. After the number $n_x$ of the pixels between the user's two eyes in the length direction and the number $n_y$ of the pixels between the user's two eyes in the width direction are obtained, the system of the electronic device may perform the operation of multiplying the number $n_x$ of the pixels between the user's two eyes in the length direction with the size $L_x$ of the pixel in the length direction, and the number $n_y$ of the pixels between the user's two eyes in the width direction with the size $L_y$ of the pixel in the width direction.

The distance d between the users' two eyes in the image Z is the distance in a hypotenuse direction of a right-angled triangle in FIG. 4, therefore, the distance d between the users' two eyes in the image can be computed using the following equation (4):

$$d = \sqrt{(n_x \times L_x)^2 + (n_y \times L_y)^2} \qquad \text{Equation (4)}$$

The distance d between the users' eyes can be computed by the equation (4). The distance d between the users' eyes in the image can be computed more precisely by the equation (4) when the connection line between the users' eyes is not parallel with either the length direction or the width direction of a pixel.

It can be understood that, the closer the user's eyes to the screen, the larger the number of the pixels between the user's two eyes in the captured image containing the user's two eyes, namely, the larger the converted distance d between the user's two eyes in the image becomes. On the contrary, the farther away the user's two eyes from the screen, the smaller the number of the pixels between the user's two eyes in the captured image containing the user's two eyes, namely, the smaller the converted distance between the user's two eyes d in the image.

Other steps such as S21, S22, S24 and S24 of this example are the same as those of the first example of this embodiment, and will not be repeated herein.

In the above described embodiment, the image containing the user's two eyes is preferably captured by the front camera of the electronic device, which can capture a human face more efficiently.

According to the above description, the method for warning a user about keeping a proper distance between the user's eyes and the screen (monitor display) may ensure that the distance between the user's two eyes and the screen is larger than the preset distance between the user's eyes and the screen, i.e. the safe distance, so as to protect the eyesight and avoid dry eyes and damage to the eyes damage caused by watching the screen in a too short distance and for a long time. When the distance between the user's eyes and the screen of the electronic device is too close, the user is warned, thereby protecting the eyesight and reducing the harm to the eyesight of the user.

Figure 5:
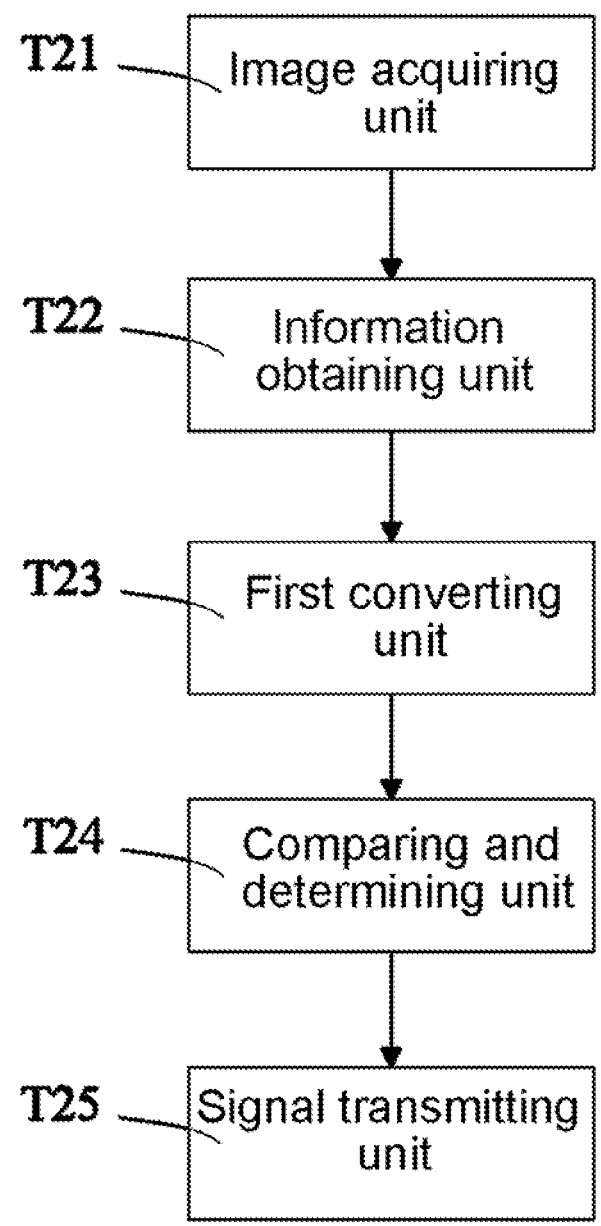
FIG. 5 is a block diagram of an electronic device provided by the second embodiment of the disclosure.

The embodiment also provides an electronic device. FIG. 5 is a block diagram of an electronic device provided by the second embodiment of the disclosure. The electronic device includes an image acquiring unit T21, an information obtaining unit T22, a first converting unit T23, a comparing and determining unit T24, and a signal transmitting unit T25. Functions of each unit will be described below.

The image acquiring unit T21 is configured to capture an image containing the user's two eyes. This image capturing unit operates in the same or similar way as the step S21 in the second embodiment.

The information obtaining unit T22 is configured to obtain the number of the pixels between the user's two eyes from the image. The information obtaining unit operates in the same or similar way as the step S23 in the second embodiment.

The first converting unit T23 is configured to convert the number of pixels between the user's two eyes into the distance between the user's two eyes in the image. The converting way of the first converting unit is the same or similar as the step S23 in the second embodiment.

The comparing and determining unit T24 is configured to compare the number of pixels between the user's two eyes with the preset number of the pixels to determine whether the number of the pixels between the user's two eyes is more than the preset number of the pixels. The comparing and determining way is the same as the step S24 in the second embodiment.

The signal transmitting unit T25 is configured to enable the electronic device to warn the user if the number of pixels between the user's two eyes is larger than or equal to the preset number of pixels, which indicates that the distance between the user's two eyes and the screen is too close. The signal transmitting unit operates in the same or similar way as the step S25 in the second embodiment.

Optionally, the electronic device may be a cell phone, a tablet computer, a notebook computer, a desktop computer, or other electronic devices that can be used by the user for a long time. All those electronic devices can be configured to warn the user to increase the distance from the electronic device when the user is too close to the screen (display) of the electronic device, so as to protect the eyesight of the user.

Preferably, the safe distance may be different for different electronic devices. The screen size and watching distance are different for the cell phone, the tablet computer, the notebook computer, or a desktop computer, therefore, the preset distances between the user's eyes and the display is also different. The method can be used to different electronic devices by setting different preset distances between the eyes and the device display, thereby broadening the application of the method.

Preferably, the image acquiring unit is the front camera of the electronic device, which may be a wide-angle camera. The wide angle camera has a relative wide viewing angle and can capture the image of the user's eyes more correctly so as to reduce the dead viewing angle. The step for acquiring the image containing the user's eyes should be performed at a predetermined interval. In other words, the step of acquiring (capturing) the image containing the user's eyes is carried out at uniformly spaced intervals.

When the distance between the user's eyes and the screen of the electronic device is relatively close. The electronic device provided by the second embodiment of the present disclosure will warn that the user is too close to the screen and should increase the distance from the screen when the eyes of the user is too close to the screen, thereby preventing the dry eyes and the harm to eyes resulted by watching the screen in a short distance and for a long time, so as to protect the eyesight.

Third Embodiment

The third embodiment of the present disclosure provides a method for warning a user about an improper distance between the user's eyes and the screen. The method comprises: acquiring an image containing the user's eyes; obtaining the number of the pixels between the user's eyes from the captured (acquired) image; converting the number of the pixels between the user's eyes into the distance between the user and the screen; comparing the distance between the user's eyes with a preset value; and warning the user if the distance between the user's eyes is more than the preset value. In the third embodiment, the preset value is a safe distance.

Figure 6:
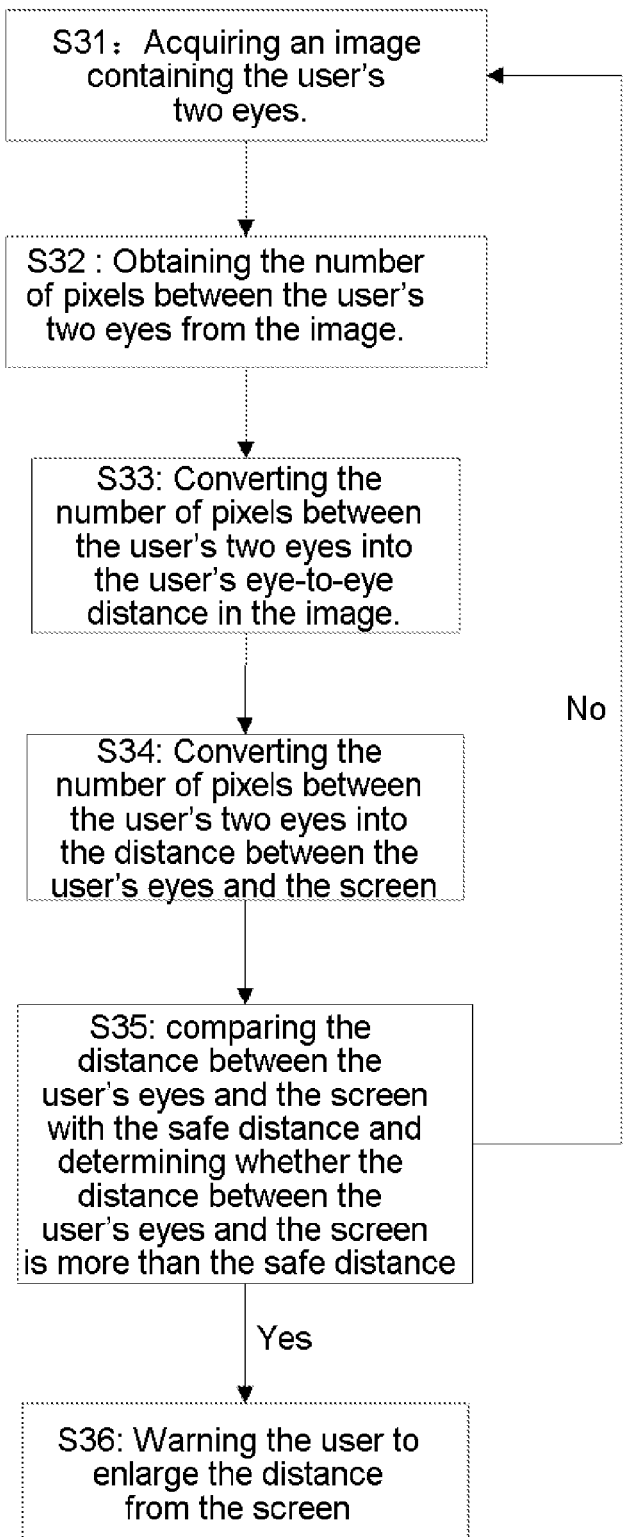
FIG. 6 is a flowchart of a method for warning a user about a distance between user's eyes and a screen according to a third embodiment of the disclosure.
Figure 7:
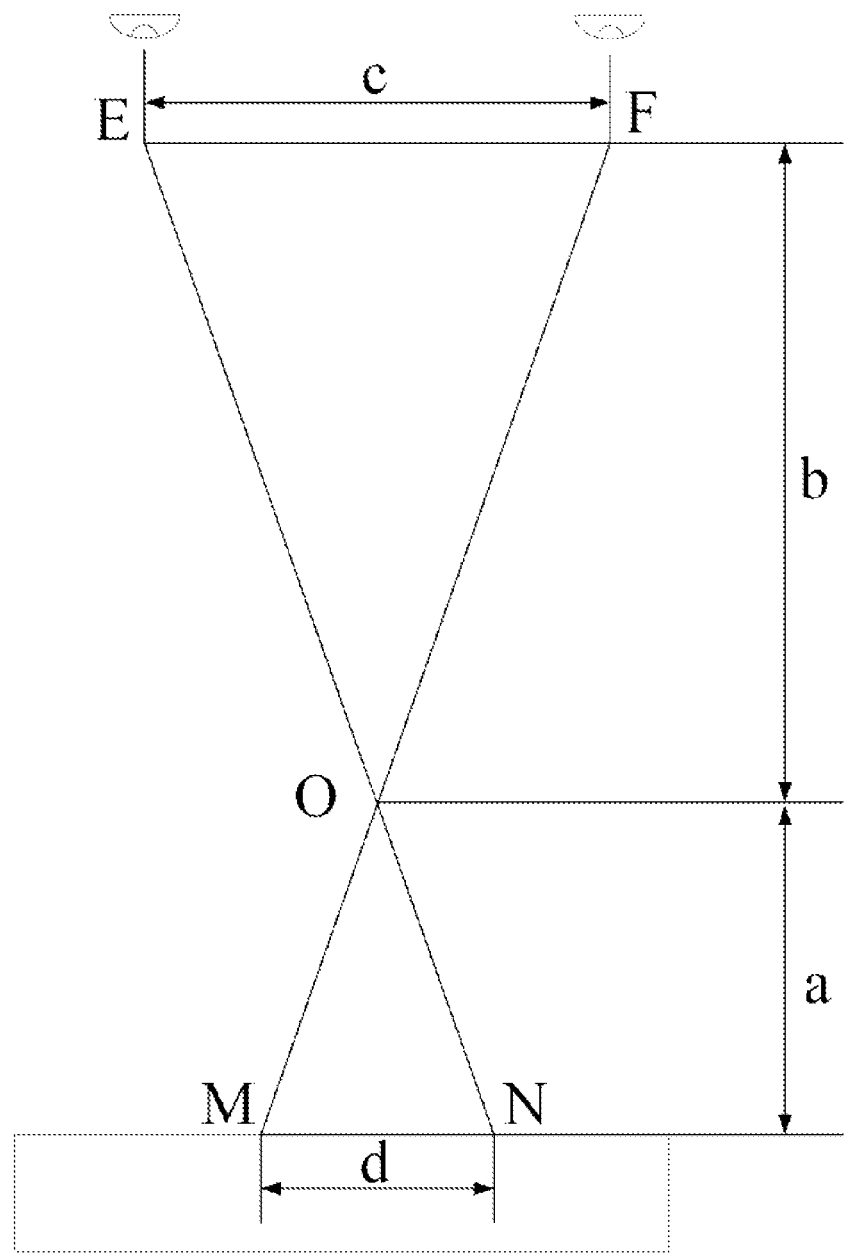
FIG. 7 is a mathematical diagram for computing the distance between the user's eyes according to the third embodiment of the disclosure.

Referring to FIG. 6 and FIG. 7, FIG. 6 is a flowchart of a method for warning a distance between the user's eyes and a screen provided by a third embodiment, and FIG. 7 is a principle diagram for computing the distance between the user's eyes and the screen provided by the third embodiment. In the method provided by the third embodiment of the disclosure, steps S31, S32 and S33 are the same to the steps S21, S22 and S23 of the second embodiment respectively. Therefore, only the differences between the second embodiment and the third embodiment will be described below.

After step S33 is performed, step S34 is carried out to convert the number of pixels between the user's eyes into the distance between the user's eyes and the screen.

When a front camera takes an image, lights respectively reflected from the user's eyes E and F intersect with each other on lens O of the front camera and then respectively project onto two points M and N on light sensors of a backstage of the electronic device. The two points M and N namely are the user's eyes in the image, and the distance between the users' eyes E and F is "c", the distance between the users' eyes M and N in the image is "d", "a" is the focal length of the front camera, the vertical distance between a connection line between the users' eyes and the lens O of the front camera is "b". Because the lens O of the front camera is located at the same plane with the screen, b is the distance between the user's eyes and the display screen. It should be noticed that, the lens O of the front camera and the display screen are not shown in the same plane in order to clearly show the focal length a. As shown in FIG. 7, a triangle formed by the user's eyes E and F and the lens O of the front camera and another triangle formed by the user's eyes M and N in the image and the lens O of the front camera constitute a pair of similar triangles. Inferred from the theorem of similar triangle, the relation between the distance b between the user's eyes and the display screen, and the distance d between the user's two eyes in the image is:

$$a \div b = d \div c \qquad \text{Equation (5)}$$

wherein, a is the focal length of the front camera; c is the distance between the user's eyes.

An equation (6) as below can be transformed from the equation (5):

$$B = a \times c \div d \qquad \text{Equation (6)}$$

As can be seen from the equation (6), the distance b between the user's eyes and the display screen relates to the distance between the user's eyes d in the image, the distance between the user's eyes c, and the focal length a of the front camera. It should be noticed that the focal length a of the front camera is pre-stored in the electronic device. The front cameras of different kinds of electronic devices have different focal length. Herein, the distance c is an average distance between the two eyes of an adult which is pre-stored. Preferably, different average distance c between the two eyes for different genders and ages can be pre-stored in the electronic device.

It can be understood that, the closer the user's eyes is to the screen, the larger is the number of pixels between the user's eyes in the captured image containing the user's eyes, and the larger the converted distance between the user's eyes d in the image increase, and the smaller the converted distance b between the user's eyes and the display screen decreases, thus the converted distance between the user and the screen d in the image becomes larger. On the contrary, when the user's eyes are far away from the screen, the number of pixels between the user's two eyes in the acquired image containing the user's two eyes decreases and the converted distance between the user's two eyes d in the image decrease and the converted distance b between the user's eyes and the display screen increases.

Step S35 is performed to compare the distance between the user's eyes and the screen with the safe distance to determine whether the distance between the user's eyes and the screen is larger than the safe distance. The distance b between the user's eyes and the screen obtained in the step S34 is compared with the safe distance to determine whether the distance between the user's eyes and the screen is larger than the safe distance.

The preset safe distance can be obtained through approaches described below. Suppose that there is a user and a distance between the user's eyes is the average distance between the two human eyes. When this user uses this kind of electronic device within a certain distance, the distance between the user and the screen being proper to the user's eyesight is the safe distance. Preferably, a plurality of the safe distances may be pre-stored in the electronic device. For example, a plurality of the safe distances for different genders and ages of people may be pre-stored. In the step S35, the plurality of the safe distances are compared with the distance between the user's eyes and the screen in turn to determine whether the distance between the user's eyes and the screen is more than one of the plurality of the safe distance. Setting the plurality of the safe distances enables the method for warning the distance between the user's eyes and a screen is more suitable for the user.

Optionally, the safe distance can be manually set by the user. Specifically, before using the method, the user is required to manually set the safe distance. The electronic device is placed in a position where is comfortable for the eyes to watch, and then is controlled to capture an image containing the user's eyes. Then, a pre-stored software program in the electronic device can obtain the number of the pixels between the user's two eyes in the image. The number of pixels is converted into the distance between the user's eyes, which is further converted into the distance between the user's eyes and the screen. The approach for manually setting the safe distance is more suitable for the user's personal habits, this makes the method be more humanized.

If the distance between the user's eyes and the screen is smaller than the safe distance, then the step S36 is performed. When the distance between the user's eyes and the screen is smaller than the safe distance, which indicates that the distance between the user's eyes and the screen is too close, then the user is warned to increase the distance from the screen to prevent eyestrain caused by a close distance use. The user can be warned by means of displaying eye protecting images, blanking the screen, popping-up a (visual) warning signal or message, or playing an acoustic warning signal or a voice warning message. After warning the user, the process returned to the step S31 to perform the next loop after a predetermined time.

If the distance between the user's eyes and the screen is larger than the safe distance, which indicates that the distance between the user's eyes and the screen is within the safe distance, then the method returns to the step S31 to perform the next loop after a predetermined time.

Preferably, the time interval between the implementation of every two steps S21 is equal, so as to guarantee the eye-protection effect of the user thereby preventing eyestrain caused by the too close distance between the eyes and the screen.

The method for computing the distance between the user's eyes and a screen and warning the distance between the user's eyes and the screen to the user provided by the embodiment will precisely measure the distance between the user's eyes and the screen, so as to protect the user's eyesight.

Figure 8:
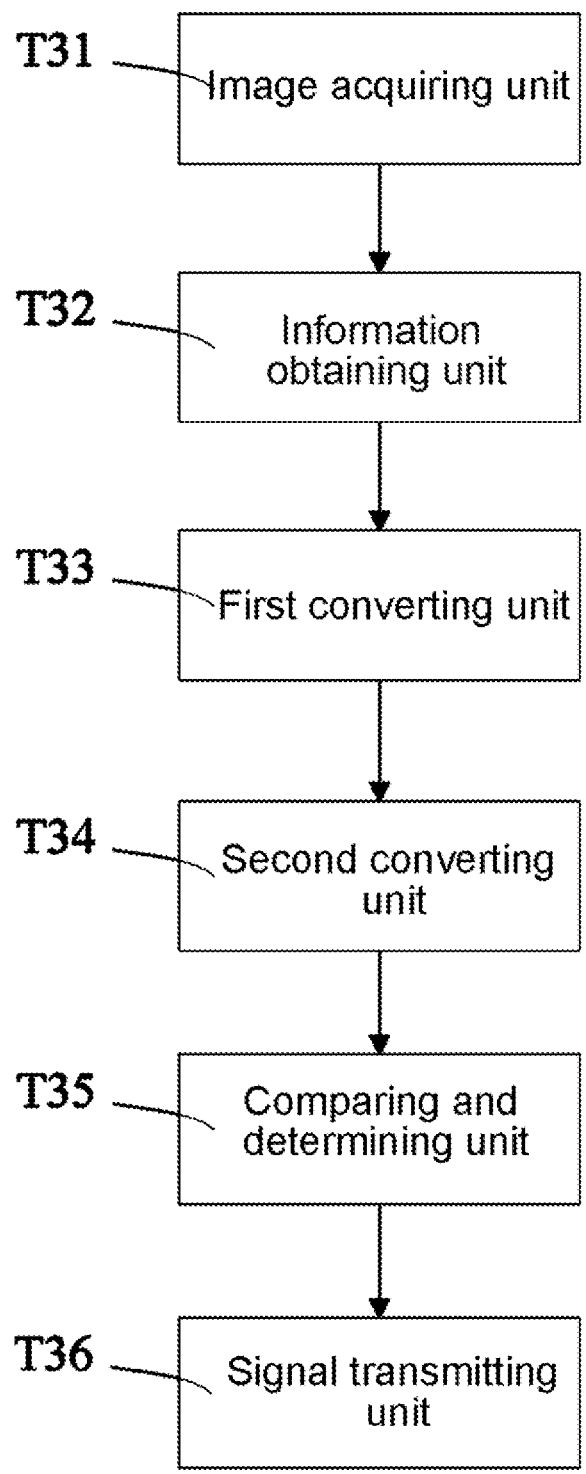
FIG. 8 is a block diagram of an electronic device according to the third embodiment of the disclosure.

The embodiment also provides an electronic device. FIG. 8 is a block diagram of an electronic device provided by the third embodiment of the disclosure. The electronic device includes an image acquiring unit T31, an information obtaining unit T32, a first converting unit T33, a second converting unit T34, a comparing and determining unit T35, and a signal transmitting unit T36. Functions of each unit will be described below.

The image acquiring unit T31 is configured to capture an image containing the user's two eyes. This image acquiring way is the same as the step S31 in the third embodiment.

The information obtaining unit T32 is configured to obtain the number of the pixels between the user's two eyes from the image. The information obtaining way is the same as the step S33 in the third embodiment.

The first converting unit T33 is configured to convert the number of the pixels between the user's two eyes into the distance between the user's two eyes in the image. The converting way of the first converting unit is the same as the step S33 in the third embodiment.

The second converting unit T34 is configured to convert the number of the pixels between the user's two eyes into the distance between the user's eyes and the screen. The converting way of the second converting unit is the same as the step S34 in the third embodiment.

The comparing and determining unit T35 is configured to compare the distance between the user's eyes and the screen with the safe distance to determine whether the distance between the user's eyes and the screen is larger than the safe distance. The comparing and determining way is the same as the step S34 in the third embodiment.

The signal transmitting unit T35 is configured to enable the electronic device to warn the user if the distance between the user's eyes and the screen is smaller than the safe distance, which indicates that the distance between the user's eyes and the screen is too close. The warning way is the same as the step S36 in the third embodiment.

Optionally, the electronic device may be a cell phone, a tablet computer, a notebook computer, a desktop computer, or other electronic devices that can be used by the user for a long time. All those electronic devices can be configured to warn the user to increase a distance from the electronic device when the user places his/her face too close to the electronic device, so as to protect the eyesight of the user.

When the method for comparing the distance between the user's eyes and the screen with a safe distance is used to warn the user, the safe distance may be different for different electronic devices. The screen size and watching distance are different for the cell phone, the tablet computer, the notebook computer, or a desktop computer, therefore, the safe distances of these electronic devices are also different. The method can be used to different electronic devices by setting different safe distances, thereby broadening the application of the method.

Preferably, the image acquiring unit is a front camera of the electronic device, which may be a wide-angle camera. The wide-angle camera has a relative wide viewing angle and can capture the image of the user's eyes more correctly, so as to reduce the dead viewing angle.

Fourth Embodiment

The fourth embodiment of the present disclosure provides a method for warning a user about a distance between the user's eyes and a screen. The method comprises: acquiring an image containing the user's two eyes; obtaining the number of pixels between the user's eyes from the image and comparing the number of pixels between the user's eyes with a preset value; and warning the user if the number of pixels between the user's eyes is larger than the preset value. In the fourth embodiment, the method further comprises: detecting a working (operation) state of the screen before acquiring the image containing the user's two eyes; stopping implementing the method (stopping the operation) when the screen is in a dormant state; and acquiring the image containing the user's eyes when the screen is in an active state.

Figure 9:
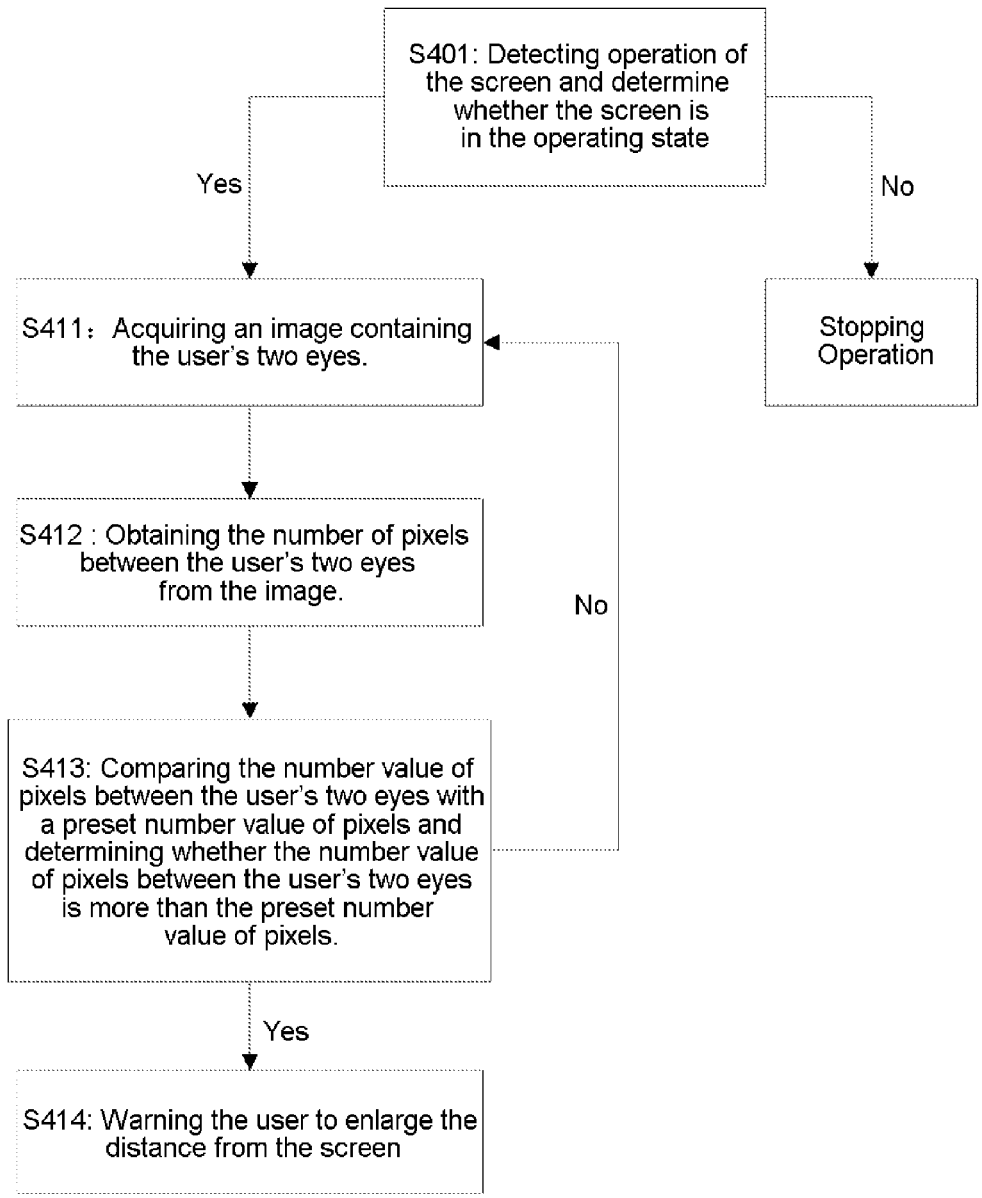
FIG. 9 is a flowchart of a method for warning a user about a distance between user's eyes and a screen according to a first example of a fourth embodiment of the disclosure, which includes detecting a working state of the screen.

Based on the above described embodiment, a first example of the fourth embodiment provides a method for warning a user to about a distance between the user's eyes and a screen. FIG. 9 is a flowchart of a method for warning a user about a distance between the user's eyes and a screen according to a fourth embodiment of the disclosure. The method includes steps S401, S411, S412, S413 and S414. The descriptions of steps S411, S412, S413 and S414 are not repeated therein since they are the same as the steps S11, S12, S13 and S14 of the first embodiment respectively, therefore only the differences between the first embodiment and the fourth embodiment will be described below.

Before performing the step S411, the step S401 is performed to detect the working (operation) state of the screen and determine whether the screen is in the active state through a backstage software program (instructions or codes executable by a processing unit of the electronic device). If the screen is in the active state, then the step S411 is performed to acquire the image containing the user's two eyes. If the screen is in a dormant state then the operation is stopped and the step S411 is not performed to acquire the image.

Figure 10:
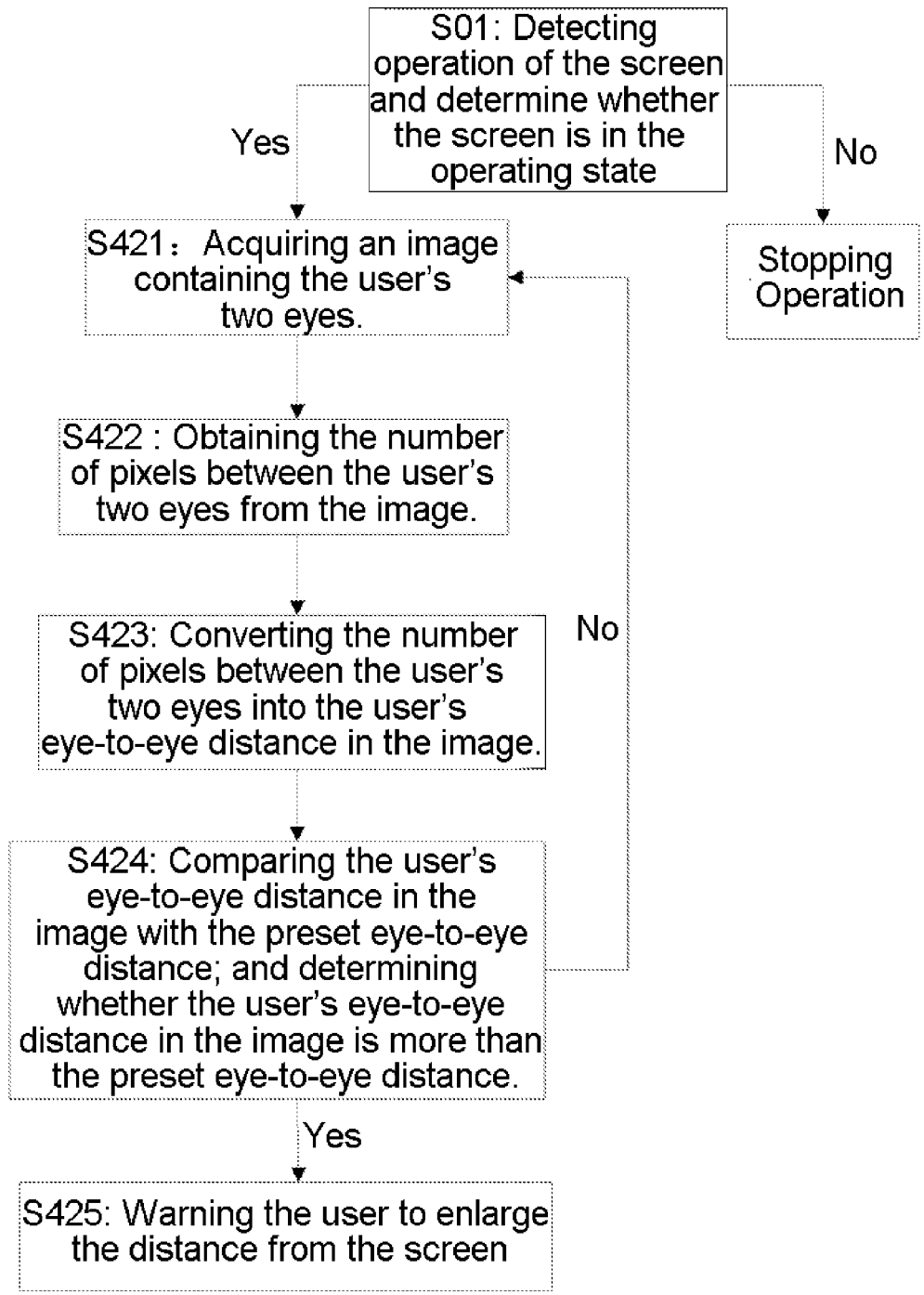
FIG. 10 is a flowchart of another method for warning a user about a distance between user's eyes and a screen according to a second example of the fourth embodiment of the disclosure, which includes detecting a working (an operating) state of the screen.

A second example of the fourth embodiment of the present disclosure provides a method for warning a user about distance between the user's eyes and a screen. Referring to FIG. 10, FIG. 10 is a flowchart of a method for warning a user about distance between the user's eyes and a screen according to the second example of the fourth embodiment of the disclosure. The method includes steps S01, S421, S422, S423, S424 and S425. The descriptions for steps S421, S422, S423, S424 and S425 are not repeated herein since they are the same to steps S21, S22, S23, S24 and S25 of the second embodiment respectively, therefore only differences between the second embodiment and the second example of the fourth embodiment will be described below.

Before performing the step S421, the step S01 is performed to detect a working (operation) state of the screen and determine whether the screen is in the active state through backstage software. If the screen is in the active state, then the step S421 is performed to acquire the image containing the user's eyes. If the screen is in a dormant state, the operation is stopped and the step S421 is not performed to acquire the image.

Figure 11:
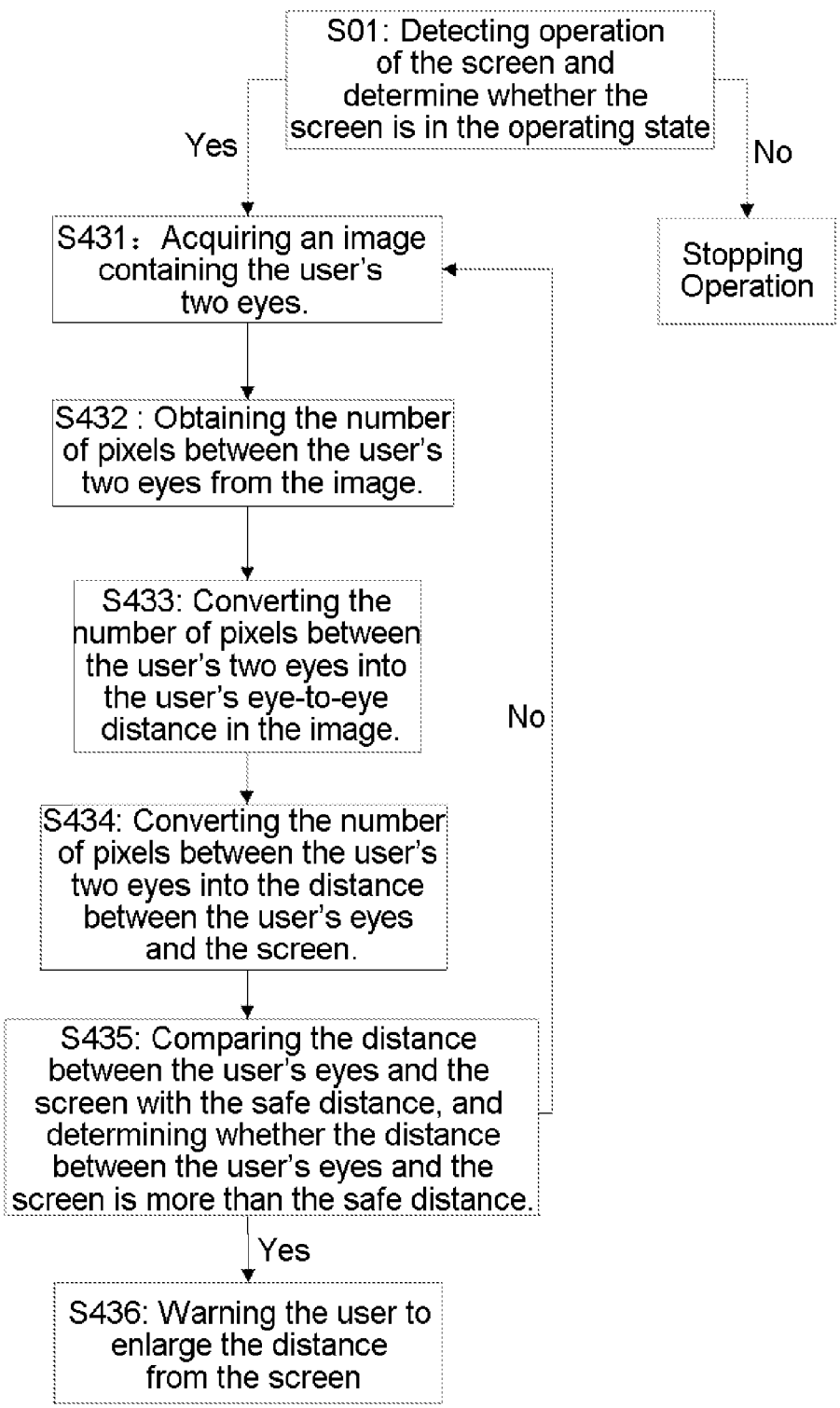
FIG. 11 is a flowchart of another method for warning a user about a distance between user's eyes and a screen according to a third example of the fourth embodiment of the disclosure, which includes detecting a working state of the screen.

A third example of the fourth embodiment of the present disclosure provides a method for warning a user about distance between the user's eyes and a screen. Referring to FIG. 11, FIG. 11 is a flowchart of a method for warning a user about distance between the user's eyes and a screen according to a third example of the fourth embodiment of the disclosure. The method includes steps S01, S431, S432, S433, S434, S435 and S436. The descriptions for steps S431, S432, S433, S434, S435 and S436 are not repeated therein since they are the same as the steps S31, S32, S33, S34, S35 and S36 of the third embodiment respectively, therefore only differences between the third embodiment and the third example of the fourth embodiment will be described below.

Before implementing the step S431, the step S01 is performed to detect a working (operation) state of the screen and determine whether the screen is in the active state through backstage software. If the screen is in the active state, the step S431 is performed to acquire the image containing the user's two eyes. If the screen is in a dormant state, the operation is stopped and the step S431 is not performed to acquire the image.

The method for warning a user about distance between the user's eyes and a screen provided by this embodiment can determine whether an image is required to capture to warn the user to keep the distance between the user and the screen according to the working (operation) state of the screen, thereby reducing energy consumption, saving power and prolonging standby time of the screen efficiently.

Figure 12:
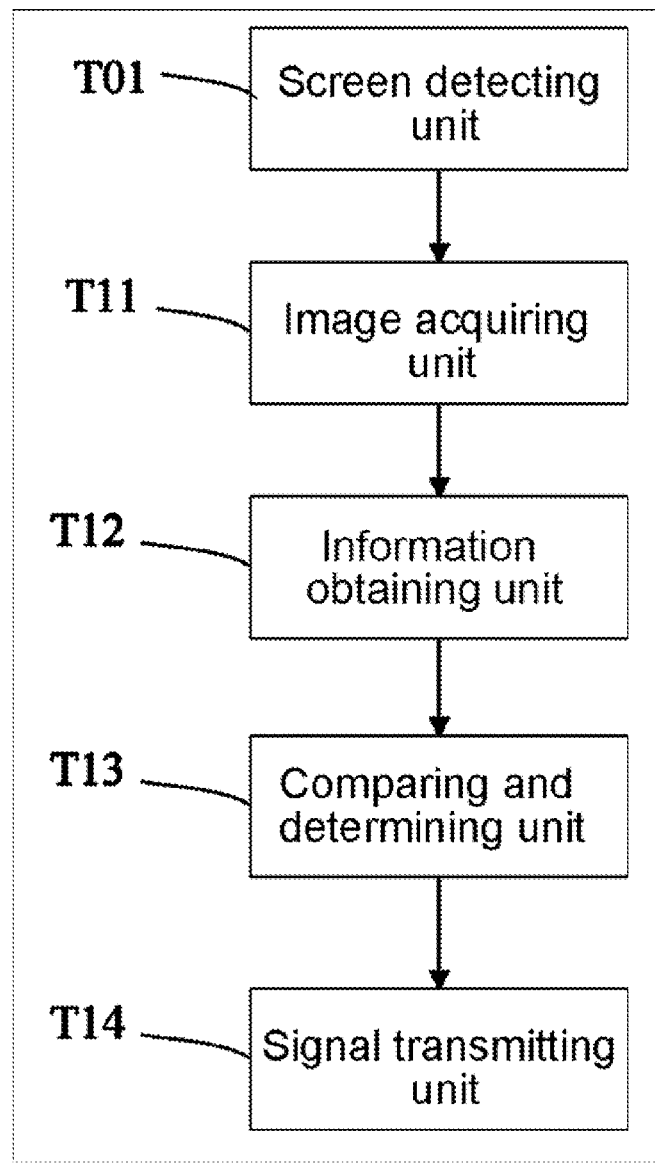
FIG. 12 is a block diagram of an electronic device according to the fourth embodiment of the disclosure.

The embodiment also provides an electronic device. FIG. 12 is a block diagram of an electronic device provided by the fourth embodiment of the disclosure. The electronic device includes a screen detecting unit T01, an image acquiring unit T11, an information obtaining unit T12, a comparing and determining unit T13, and a signal transmitting unit T14, the functions of each unit will be described below.

The screen detecting unit T01 is configured to detect a working (operation) state of the screen. The screen detecting way is the same as the step S411 in the first example of the fourth embodiment.

The image acquiring unit T11 is configured to acquire an image containing the user's two eyes. The image acquiring way is the same as the step S411 in the first example of the fourth embodiment.

The information obtaining unit T12 is configured to obtain the number of the pixels between the user's two eyes from the image. The information obtaining way is the same as the step S13 in the first embodiment.

The comparing and determining unit T13 is configured to compare the number of the pixels between the user's two eyes with a preset number of the pixels to determine whether the number of the pixels between the user's two eyes is more than the preset number value of the pixels. The comparing and determining way is the same as the step S13 in the first embodiment.

The signal transmitting unit T14 is configured to enable the electronic device to warn the user if the number of the pixels between the user's two eyes is larger than or equal to the preset number of the pixels, which indicates that the distance between the user's eyes and the screen is too close. The warning way is the same as the step S14 in the first embodiment.

Fifth Embodiment

The fifth embodiment of the present disclosure provides a method for warning a user about distance between the user's eyes and a screen. The method comprises: acquiring an image containing the user's eyes; obtaining the number of pixels between the user's two eyes from the image; comparing the number of pixels between the user's eyes with a preset value; and warning the user if the number of pixels between the user's eyes is larger than the preset value. In the fifth embodiment, the method further comprises: using human face recognition technology for recognizing the acquired image to determine whether the image contains the user's eyes after acquiring an image containing the user's eyes; reacquiring the image containing the user's eyes if the previously acquired image does not contain the user's eyes; obtaining the number of pixels between the user's eyes from the previously acquired image if the previously acquired image contains the user's eyes.

Figure 13:
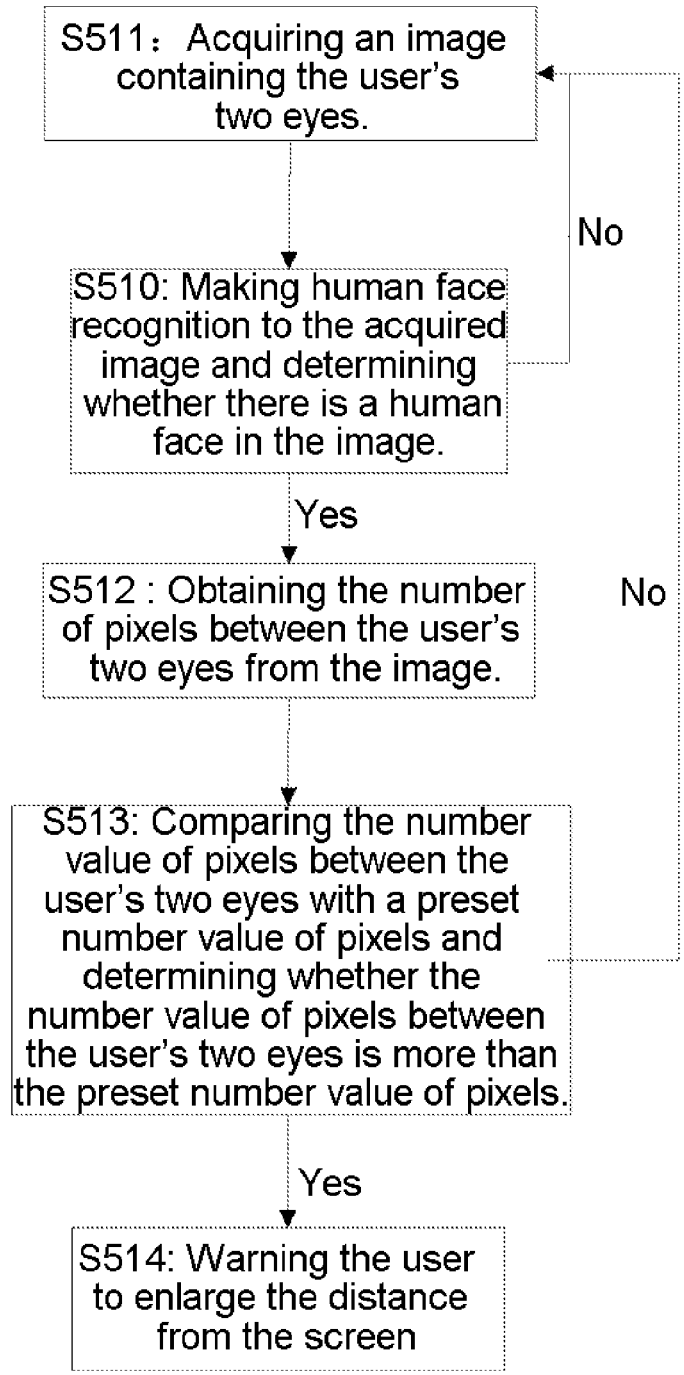
FIG. 13 is a flowchart of a method for warning a user about a distance between user's eyes and a screen according to a first example of a fifth embodiment of the disclosure, which includes detecting a working (operating) state of the screen.

Based on the above description, a first example of the fifth embodiment of the disclosure provides a method for warning a user about distance between the user's eyes and a screen. The method further includes a step for recognizing a human face. Referring to FIG. 13, FIG. 13 is a flowchart of a method for warning a user about distance between the user's eyes and a screen according to a first example of the fifth embodiment of the disclosure. The method includes steps S511, S510, S512, S513 and S514. Descriptions to steps S511, S512, S513 and S514 are not repeated herein since they are the same as steps S11, S12, S13 and S14 of the first embodiment respectively, therefore only differences between the first embodiment and the first example of fifth embodiment will be described below.

After performing the step S511, the step S510 is performed to recognize the human face to determine whether the image contains the user's eyes. The method further includes performing pre-processing such as graying and illumination compensating to the image acquired in the step S511 to improve the quality of the image and obtain a gray image, then recognize the human face from the acquired gray image. A frame difference approach and a hybrid Gaussian background modeling approach are used detect the human face in the image. If there is no human face in the image, the method returns to the step S511 to reacquire an image containing the user's eyes. If there is a human face in the image, then the step S512 is performed to obtain the number of pixels between the user's eyes from the image.

Figure 14:
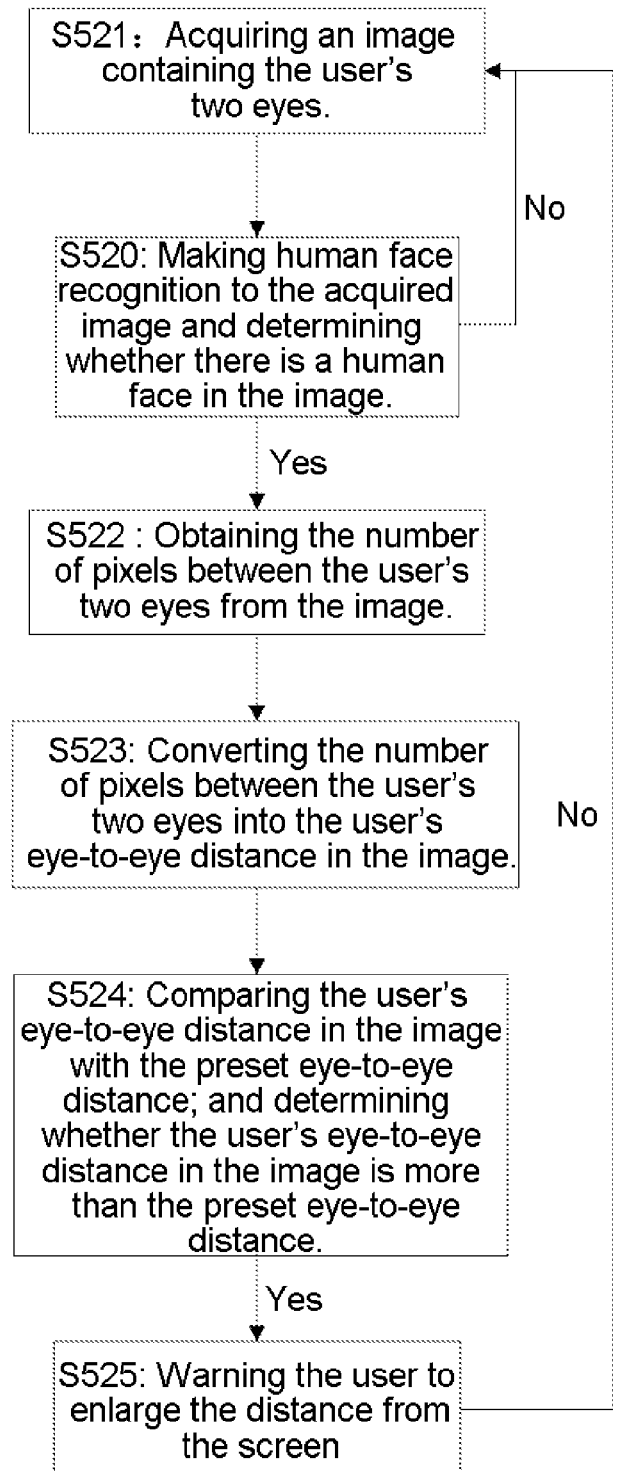
FIG. 14 is a flowchart of another method for warning a user about a distance between user's eyes and a screen according to a second example of the fifth embodiment of the disclosure, which includes detecting a working (operating) state of the screen.

A second example of the fifth embodiment of the present disclosure provides a method for warning a user about distance between the user's eyes and a screen. The method further includes a step for recognizing a human face. Referring to FIG. 14, FIG. 14 is a flowchart of a method for warning a user about distance between the user's eyes and a screen according to a second example of the fifth embodiment of the disclosure. The method includes steps S521, S520, S522, S523 and S524. Descriptions for steps S521, S522, S523 and S524 are not repeated herein since they are the same as steps S21, S22, S23 and S24 of the second embodiment respectively, therefore, only differences between the second embodiment and the second example of fifth embodiment will be described below.

After implementing the step S521, the step S520 is performed to recognize human face from the image to determine whether the image contains the user's eyes. The method further includes the step of pre-processing, such as graying and illumination compensating, the image acquired in the step S521 to improve quality of the image and obtain a gray image, then recognizing the human face from the acquired gray image. A frame difference approach and a hybrid Gaussian background modeling approach are used to the obtained gray image to detect a human face from the image. If there is no human face in the image, then the method returns to the step S521 to reacquire an image containing the user's two eyes. If there is a human face in the image, then the step S512 is performed to obtain the number of the pixels between the user's two eyes from the image.

Figure 15:
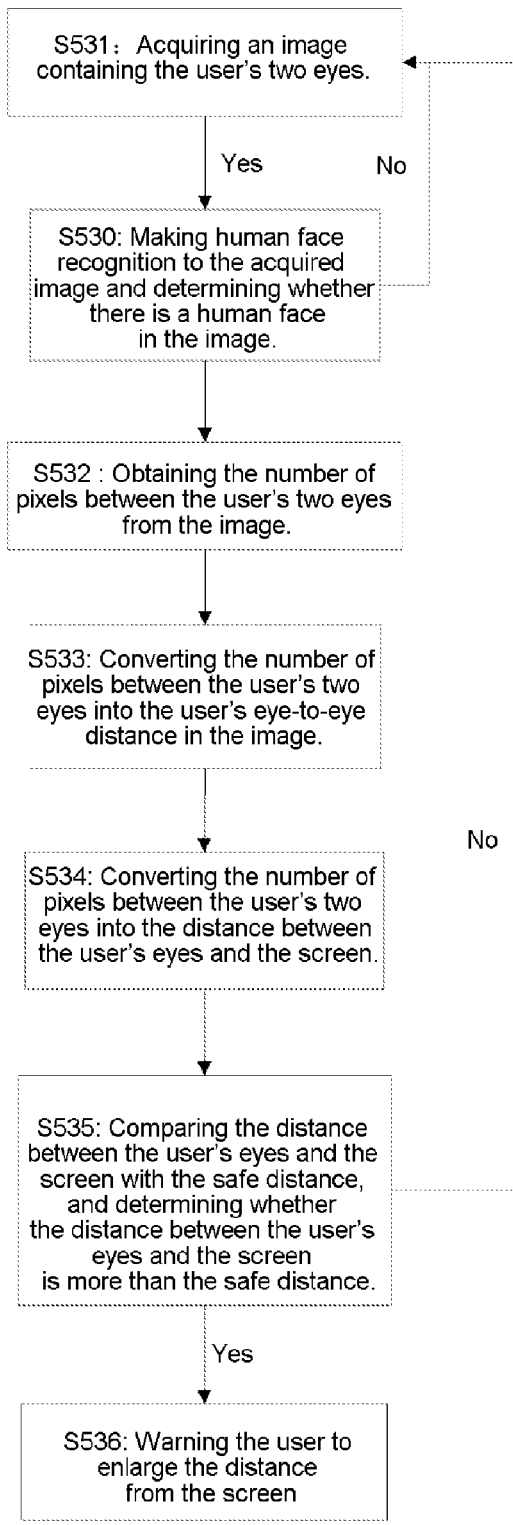
FIG. 15 is a flowchart of another method for warning a user about a distance between user's eyes and a screen according to a third example of the fifth embodiment of the disclosure, which includes detecting a working (operating) state of the screen.

A third example of the fifth embodiment of the present disclosure provides a method for warning a user about distance between the user's eyes and a screen. The method further includes a step for recognizing a human face. Referring to FIG. 15, FIG. 15 is a flowchart of a method for warning a user about a distance between the user's eyes and a screen according to a third example of the fifth embodiment of the disclosure. The method includes steps S531, S530, S532, S533 and S534. Descriptions for steps S531, S532, S533 and S534 are not repeated herein since they are the same as the steps S31, S32, S33 and S34 of the third embodiment respectively, therefore only differences between the third embodiment and the third example of the fifth embodiment will be described below.

After performing the step S531, the step S530 is performed to recognize the human face from the image to determine whether the image contains the user's two eyes. The method further includes pre-processing, such as graying and illumination compensating, the image acquired in the step S531 to improve quality of the image and obtain a gray image, then recognizing the human face from the acquired gray image. A frame difference approach and a hybrid Gaussian background modeling approach are used to the obtained gray image to detect the human face from the image. If there is no human face in the image, the method returns to the step S531 to reacquire an image containing the user's two eyes. If there is a human face in the image, the step S522 is performed to obtain the number of pixels between the user's two eyes from the image.

The method for warning a user about an improper distance between the user's eyes and a screen provided by this embodiment further includes a step of recognizing the human face from the image. In the case that no human face is contained in the acquired image, another image is reacquired until an image containing a human face is obtained, so as to reduce measurement errors and warn the user correctly, thereby achieving the goal of protecting the eyesight of the user.

Figure 16:
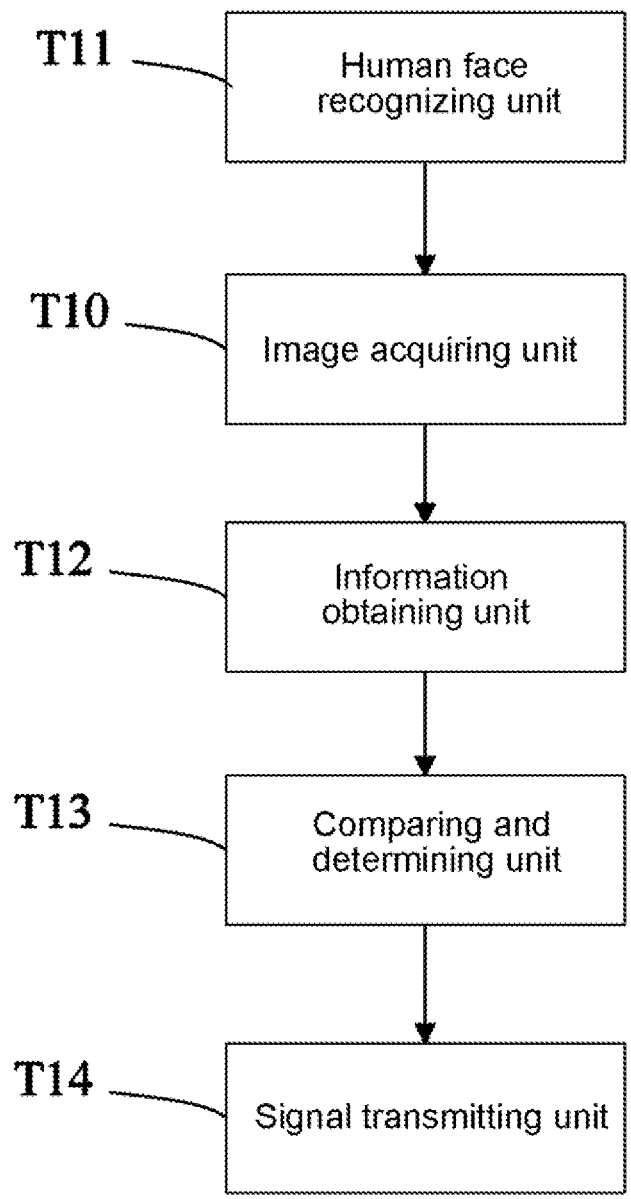
FIG. 16 is a block diagram of an electronic device provided by the fifth embodiment of the disclosure.

The embodiment also provides an electronic device. Referring to FIG. 16, FIG. 16 is a block diagram of an electronic device provided by the fifth embodiment of the disclosure. The electronic device includes an image acquiring unit T11, a human face recognizing unit T10, an information obtaining unit T12, a comparing and determining unit T13, and a signal transmitting unit T14. Functions of each unit will be described below.

The image acquiring unit T11 is configured to acquire an image containing the user's two eyes. The image acquiring way is the same as the step S11 in the first embodiment.

The human face recognizing unit T10 is configured to determine whether there is a human face in the image acquired by the image acquiring unit. The human face recognizing way is the same as the step S510 in the first example of the fifth embodiment.

The information obtaining unit T12 is configured to obtain the number of the pixels between the user's two eyes from the image. The information obtaining way is the same as the step S12 in the first embodiment.

The comparing and determining unit T13 is configured to compare the number of the pixels between the user's two eyes with a preset number of the pixels to determine whether the number of the pixels between the user's two eyes is more than the preset number of the pixels. The comparing and determining way is the same as the step S13 in the first embodiment.

The signal transmitting unit T14 is configured to enable the electronic device to warn the user if the number value of pixels between the user's two eyes is larger than or equal to the preset number value of the pixels, which indicates that the distance between the user's two eyes and the screen is too close. The warning way is the same as the step S14 in the first embodiment.

A Sixth Embodiment

Figure 17:
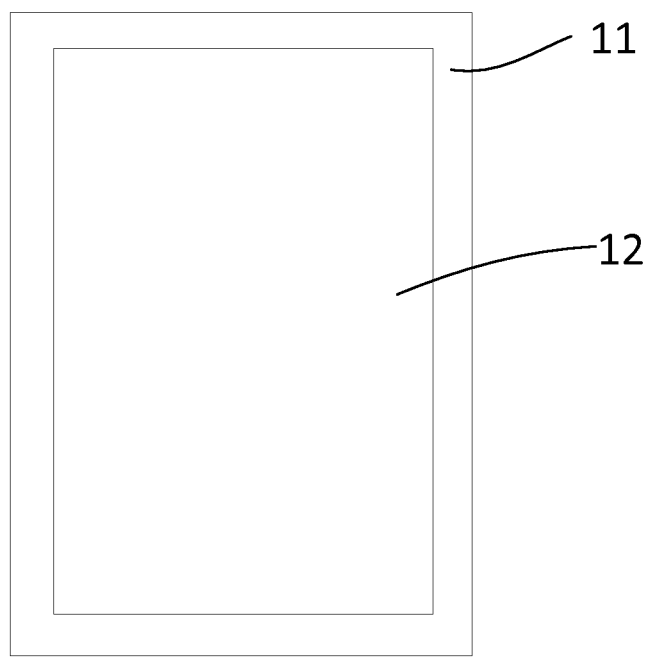
FIG. 17 is a block diagram of an electronic device provided by the sixth embodiment of the disclosure

The embodiment also provides an electronic device. Referring to FIG. 17, FIG. 17 is a block diagram of the electronic device 11 provided by the sixth embodiment of the disclosure. The electronic device 11 is the same to the electronic device in the first embodiment. As shown in FIG. 2, the electronic device 11 includes an image acquiring unit T11, an information obtaining unit T12, a comparing and determining unit T13 and a signal transmitting unit T14. Functions of each unit will be described below.

The image acquiring unit T11 is configured to acquire an image containing the user's two eyes. The image capture way is the same as the step S11 in the sixth embodiment.

The information obtaining unit T12 is configured to obtain the number of the pixels between the user's two eyes from the image. The information obtaining way is the same as the step S13 in the sixth embodiment.

The comparing and determining unit T13 is configured to compare the number of pixels between the user's two eyes with the preset number of the pixels, and to determine whether the number of the pixels between the user's two eyes is more than the preset number of the pixels. The comparing and determining way is the same as the step S13 in the sixth embodiment.

The signal transmitting unit T14 is configured to enable the electronic device to warn the user if the number of the pixels between the user's two eyes is larger than or equal to the preset number of the pixels, which indicates that the distance between the user's two eyes and the screen is relatively close. The warning way is the same as the step S14 in the sixth embodiment.

As shown in FIG. 17, the electronic device 11 provided by the sixth embodiment of the disclosure also includes a display area 12.

In conclusion, the method and electronic device for warning a user about a distance between the user's eyes and a screen provided by the present disclosure not only reduce hardware cost of electronic devices but also prevents eyestrain caused by a long time use of the electronic device, so as to protect the user's eyesight.

It will be obvious to those skilled in this art, various changes and variations to the invention will be without departing from the spirit and scope of the present invention. Therefore, the invention intends to include the various changes and variations if these changes and variations are within the scope of the claims and its equivalent of the invention.

What is claimed is:

1. A method for warning a user about a distance between user's two eyes and a screen, comprising:
    acquiring an image containing the user's two eyes;
    obtaining a number of pixels between the user's two eyes in the image and comparing the number of pixels between the user's two eyes with a preset value;
    warning the user if the number of pixels between the user's two eyes is larger than the preset value,
    wherein the preset value is a preset distance between the user's two eyes, the method further comprising:
    converting the number of pixels between the user's two eyes into a distance between the user's two eyes in the image;
    comparing the distance between the user's two eyes in the image with the preset distance between the user's two eyes; and
    warning the user if the distance between the user's two eyes in the image is larger than the preset distance between the user's two eyes,
    wherein the distance between the user's two eyes in the image is d, the number of the pixels between the user's two eyes is n, a number in a length direction of a distance between the user's two eyes is $n_x$, a number of pixels in a width direction between the user's two eye is $n_y$, and d, n, $n_x$ and $n_y$ satisfy the relation:

$$d=\sqrt{(n_x \times L_x)^2+(n_y \times L_y)^2}$$

wherein, $L_x$ is a size of a single pixel in the length direction and $L_y$ is a size of a single pixel in the width direction.

2. The method according to claim 1, wherein the preset value is a preset number of pixels, the method further comprising:
    comparing the number of pixels between the user's two eyes with the preset number of pixels; and
    warning the user if the number of pixels between the user's two eyes is larger than the preset pixel number.

3. The method according to claim 2, wherein the preset number of pixels is a number of pixels converted from a distance between the user's two eyes in the acquired image when the distance between the user's two eyes and the screen is within a safe distance.

4. The method according to claim 2, wherein the preset number of pixels is manually set by the user.

5. The method according to claim 1, wherein the preset distance between the user's two eyes is a distance between the user's two eyes in the acquired image when the distance between the user's two eyes and the screen is within a safe distance.

6. The method according to claim 1, wherein the distance between the user's two eyes in the image is d and the number of the pixels between the user's two eyes is n, and d and n satisfy the relation:

$$d=n \times L,$$

wherein L is a size of a single pixel in a length direction or a width direction.

7. The method according to claim 1, wherein the preset distance between the user's two eyes is manually set by the user.

8. The method according to claim 1, wherein the preset value is a safe distance, the method further comprising:
    converting the number of the pixels between the user's two eyes into a distance between the user's two eyes and the screen;
    comparing the distance between the user's two eyes and the screen with a safe distance; and
    warning the user if the distance between the user's two eyes and the screen is smaller than the safe distance.

9. The method according to claim 8, wherein the safe distance is a distance between the user's two eyes and the screen when an electronic device with the screen is placed at a position where it is comfortable for the eyes to watch.

10. The method according to claim 8, wherein a distance between the user's two eyes and the screen is b, a distance between the user's two eyes in the image is d, a focal length of a front camera is a, a distance between the user's two eyes is c, and a, b, c, and d satisfy the relation:

$$b=a \times c \div d.$$

11. The method according to claim 8, wherein the safe distances is manually set by the user.

12. The method according to claim 1, further comprising:
    detecting an operation state of the screen before acquiring the image containing the user's two eyes;
    stopping an operation when the screen is in a dormant state; and
    acquiring the image containing the user's two eyes when the screen is in an active state.

13. The method according to claim 1, wherein the image containing the user's two eyes is acquired by a front camera of an electronic device with the screen.

14. The method according to claim 1, wherein the step of acquiring the image containing the user's two eyes is repeated after a predetermined time.

15. The method according to claim 1, wherein the number of the pixels between the user's two eyes in the captured image is obtained using human face recognition technology.

16. The method according to claim 15, wherein the human face recognition technology comprises:
    recognizing the acquired image to determine whether the acquired image contains the user's two eyes;
    reacquiring another image containing the user's two eyes if the acquired image does not contain the user's two eyes;
    obtaining the number of pixels between the user's two eyes in the image if the acquired image contains the user's two eyes.

17. The method according to claim 1, wherein the user's two eyes refer to pupils of the user.

18. The method according to claim 1, further comprising warning the user by displaying eye protecting images, blanking the screen, popping-up a visual warning message, or playing an acoustic warning signal or a voice warning message.

19. An electronic device, comprising one or more processors, memory, and one or more program units stored in the memory and to be executed by the one or more processors, the one or more program units comprising an image acquiring unit, an information obtaining unit, a comparing and determining unit, and a signal transmitting unit; wherein, the image acquiring unit is configured to acquire an image containing user's two eyes;

the information obtaining unit is configured to obtain a number of pixels between the user's two eyes in the image;

the comparing and determining unit is configured to compare the number of pixels between the user's two eyes with a preset value;

the signal transmitting unit is configured to send a warning signal if the number of pixels between the user's two eyes is larger than the preset value, wherein the preset value is a preset distance between the user's two eyes;

the electronic device further comprises a first converting unit configured to convert the number of pixels between the user's two eyes into the distance between the user's two eyes in the image;

the comparing and determining unit is configured to compare the distance between the user's two eyes in the image with the preset distance between the user's two eyes, wherein the distance between the user's two eyes in the image is d, the number of the pixels between the user's two eyes is n, a number in a length direction of a distance between the user's two eyes is $n_x$, a number of pixels in a width direction between the user's two eye is $n_y$, and d, n, $n_x$ and $n_y$ satisfy the relation:

$$d=\sqrt{(n_x \times L_x)^2+(n_y \times L_y)^2}$$

wherein, $L_x$ is a size of a single pixel in the length direction and $L_y$ is a size of a single pixel in the width direction.

20. The electronic device according to claim 19, wherein the preset value is a preset number of pixels, and the comparing and determining unit is configured to compare the number of the pixels between the user's two eyes with the preset number of pixels.

21. The electronic device according to claim 19, wherein:
the preset value is a safe distance;
the electronic device further comprises a second converting unit configured to convert the number of the pixels between the user's two eyes into the distance between the user's two eyes and the screen; and
the comparing and determining unit is configured to compare the distance between the user's two eyes and the screen with the safe distance.

22. The electronic device according to claim 19, further comprising a detecting unit configured to detect a working state of the screen before the image acquiring unit acquires the image containing the user's two eyes; the image acquiring unit stops acquiring the image when the screen is in an operation state, and acquires the image when the screen is in an active state.

23. The electronic device according to claim 19, further comprising a human face recognizing unit configured to determine whether there is a human face in the image acquired by the image acquiring unit, and to enable the image acquiring unit to reacquire another image if the previously acquired image does not contain the human face.

24. The electronic device according to claim 19, wherein the electronic device is a cell phone, a tablet computer, a notebook computer, or a desktop computer.

25. The electronic device according to claim 19, wherein the preset value is different for different electronic devices.

26. The electronic device according to claim 19, wherein the signal transmitting unit is configured to send the warning signal by displaying eye protecting images, blanking the screen, popping a warning message, or playing an acoustic warning signal or a voice message to warn the user.

27. The electronic device according to claim 19, wherein the image acquiring unit is a front wide-angle camera.

* * * * *